April 16, 1963 R. L. HALLOCK 3,085,463
DEFORMABLE TUBULAR FASTENER WITH EXTERNAL TAPPING THREADS
Filed Nov. 27, 1959 3 Sheets-Sheet 1
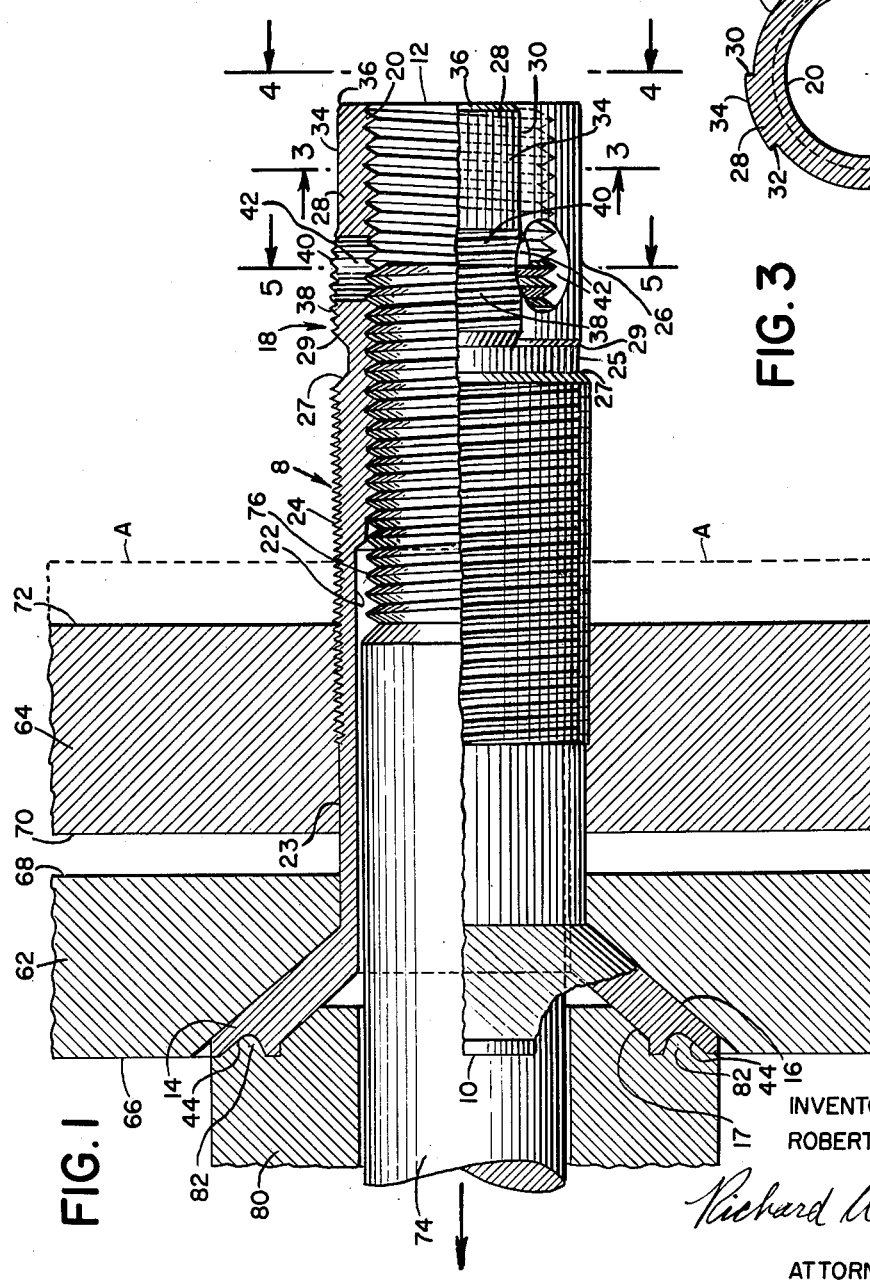
INVENTOR
ROBERT L. HALLOCK
ATTORNEY

INVENTOR
ROBERT L. HALLOCK

*Richard M. Craig*

ATTORNEY

April 16, 1963 R. L. HALLOCK 3,085,463
DEFORMABLE TUBULAR FASTENER WITH EXTERNAL TAPPING THREADS
Filed Nov. 27, 1959 3 Sheets-Sheet 3
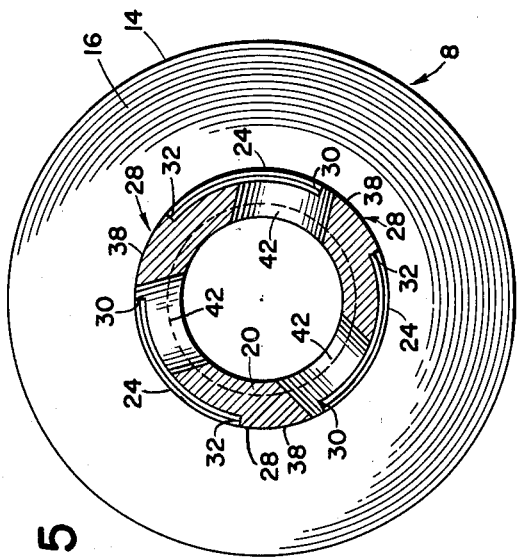
FIG. 5
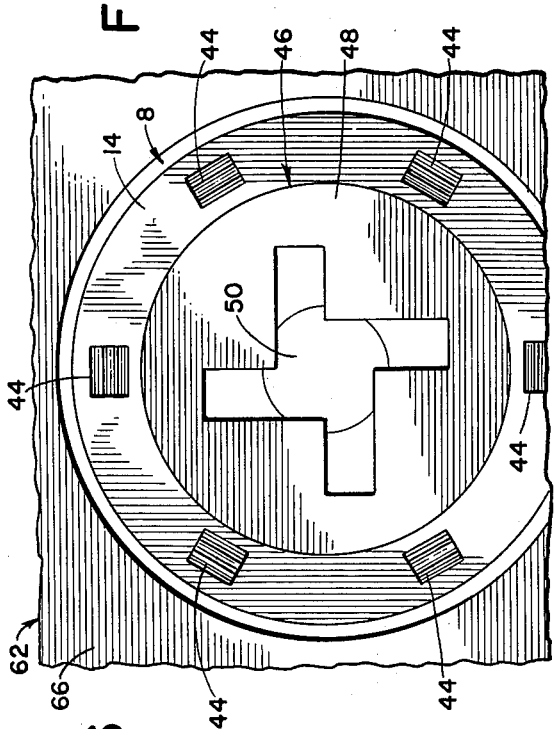
FIG. 7
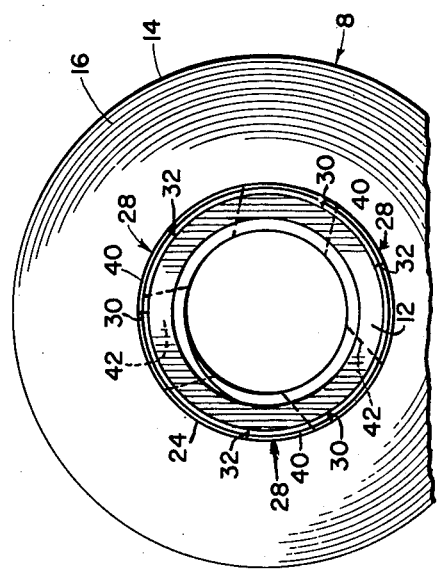
FIG. 4
FIG. 6
INVENTOR
ROBERT L. HALLOCK
*Richard R. Craig*
ATTORNEY United States Patent Office 3,085,463
Patented Apr. 16, 1963

3,085,463
DEFORMABLE TUBULAR FASTENER WITH
EXTERNAL TAPPING THREADS
Robert Lay Hallock, Larchmont, N.Y., assignor to Elastic Stop Nut Corporation of America, Union, N.J., a corporation of New Jersey
Filed Nov. 27, 1959, Ser. No. 855,672
4 Claims. (Cl. 85—40)

This invention relates to fastening devices and more particularly to blind fasteners and still more particularly to a blind bolt.

A blind bolt embodying the invention comes closer to simulating performancewise a connection between a standard bolt and a standard nut in a shear joint than is possible with any known prior blind bolt, of which there are many.

Ideally a blind bolt should have the following desirable features. It should enter a hole and clamp firmly against the blind side of the work to fasten the various structural layers together, with all actuation from the exposed side of the work. It should be installable in holes drilled to normal tolerances, that is, no special sizing of the holes should be required. It should produce sufficient clamp-up force to prevent relative slippage of the work layers. It should develop a uniform bearing stress pattern on the blind side of the work, in order not to impair fatigue strength by needless deformation of the work. It should produce a tight fit between itself and the work to provide efficient transfer of shear loads.

Every known prior blind bolt has at least one of the following undesirable features: it can not adjust itself to any substantial variation in work thickness without severe performance loss; the bearing area on the blind side of the work is too small, resulting in high stress concentrations; retightening is difficult or impossible; small resistance is provided to yielding under tensile load, resulting in the blind bolt acting like a loose pin in the holes through the work; installation involves pushing, pulling, heating, exploding and/or hammering, thus tending to subject the work to damaging axial loading; resistance to tensile and/or shear loading is low; it is unable to adjust for any angularity between the blind and exposed sides of the work without serious performance loss; mechanical properties are inconsistent from specimen to specimen of the blind bolt; it is incapable of being easily removed from the work without damage to the structure; the holes through the work must be pre-sized in order for the blind bolt to develop its maximum shear strength; and it must be used in holes of non-standard diameter.

Advantages of the blind bolt of the invention are that it possesses all of the desirable features referred to and that it completely eliminates most of the enumerated undesirable features and as to the others it reduces them to the point of insignificance.

Accordingly, important objects of the invention are to provide a blind bolt possessing the advantages set forth above.

Broadly, a blind bolt embodying the invention comprises a tubular sleeve defining an axis and having first and second ends, a head at the first end, an external surface having thereon a thread for threading aligned holes through a plurality of plates, the wall of the sleeve at a location between the ends thereof relatively thin and deformable away from the sleeve axis by force tending to compress the sleeve lengthwise.

The above and other objects and advantages will become apparent from the following description of examples of the invention and the accompanying drawings thereof in which:

FIG. 1 is a view showing the sleeve partly in axial section and partly in longitudinal elevation prior to any deformation thereof and also showing in section two plates which are to be fastened together by the sleeve and further showing partly in axial section and partly in longitudinal elevation parts of a tool for installing the sleeve;

FIG. 3 is a view on line 3—3 of FIG. 1;

FIG. 4 is a view of the sleeve alone on line 4—4 of FIG. 1;

FIG. 5 is a view of the sleeve alone on line 5—5 of FIG. 1;

FIG. 6 is a view on line 6—6 of FIG. 2; and

FIG. 7 is a view similar to FIG. 4 but showing a modified form of sleeve.

Figure 2:
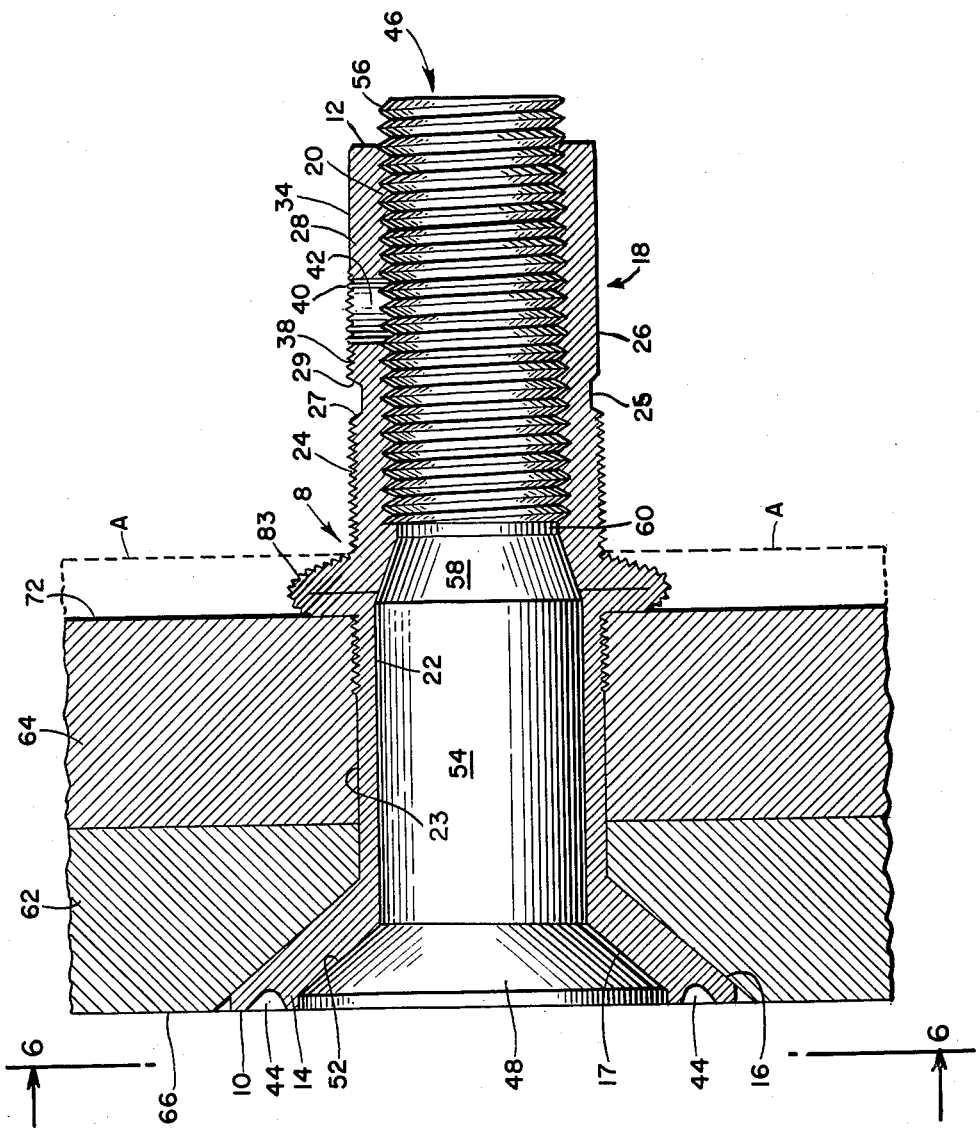
FIG. 2 is a view showing the sleeve and plates of FIG. 1 in axial section after the sleeve has been fully installed and also showing in longitudinal elevation a screw fully installed in the sleeve.

The drawings show in FIGS. 1 through 6 a one-piece tubular sleeve 8 of any suitable material such as aluminum alloy and having first and second open ends 10 and 12 and a head 14 at end 10. As shown but not necessarily head 14 is of the flush type, having outer and inner frusto-conical surfaces 16 and 17, respectively.

Sleeve 8 also has a work entering portion indicated generally at 18 extending from end 12 a predetermined distance toward head 14, this distance, however, being such that there is a considerable axial separation between portion 18 and head 14. The wall of sleeve 8 in portion 18 is relatively thick and rigid and is provided with an internal thread 20 extending axially from end 12 to the end of portion 18 remote from end 12.

Sleeve 8 further has an unthreaded internal surface 22 coaxial with thread 20. Surface 22 is circular in all sections perpendicular to the sleeve axis and extends from portion 18 to surface 17 and intersects the latter. As shown surface 22 is cylindrical and its diameter is larger than the major diameter of thread 20. It should be understood that for a reason which will appear it may be desirable that the portion of surface 22 adjacent portion 18 be slightly tapered and that the remaining portion thereof be cylindrical as shown. If surface 22 is provided with such a tapered portion it would be of greatest diameter at its circle of juncture with the cylindrical portion thereof. The included angle of the taper need be only on the order of one to three degrees in order to perform the function which is to be desired.

Sleeve 8 also has a circumferentially continuous fine external thread 24 of predetermined minor, pitch and major diameters and extending axially from a location between the axial ends of surface 22 to a location between the ends of thread 20. A cylindrical external surface 23 joins thread 24 and surface 16 and is coaxial with thread 24. The diameter of surface 23 is intermediate the minor and major diameters of thread 24 and preferably is equal to or slightly less than the pitch diameter of thread 24, for a reason which will be brought out.

Thus the wall of sleeve 8 axially between portion 18 and the end of thread 24 remote from portion 18 is relatively thin and consequently is deformable away from the sleeve axis by force tending to shorten sleeve 8.

Portion 18 of sleeve 8 also has an external cylindrical surface 26 extending from end 12 toward thread 24. The diameter of surface 26, the end of which remote from end 12 is axially spaced from thread 24, is slightly less than the minor diameter of thread 24. An external cylindrical surface 25 of slightly smaller diameter than surface 26 is located axially between thread 24 and surface 26. A frusto-conical surface 27 joins thread 24 and surface 26 and a frusto-conical surface 29 joins surfaces 26 and 28. Each of surfaces 27 and 29 makes an angle of about 45 degrees with the sleeve axis.

Sleeve 8 also has a plurality of evenly circumferentially spaced identical external lobes 28 located on and interrupting surface 26 and extending from one end to the other thereof.

As clearly shown in FIG. 3 there are three lobes 28 and each subtends an angle of about 40 degrees with respect to the sleeve axis.

Each lobe 28 has a plane leading edge 30 and a plane trailing edge 32, and the plane of each edge 30 and 32 includes the sleeve axis. Thus, each edge 30 circumferentially confronts edge 32 of an adjacent lob 28 in unobstructed fashion.

Each lobe 28 has a cylindrical surface 34 joining edges 30 and 32 thereof and of diameter equal to the minor diameter of thread 24 and located between end 12 and surface 25. Each surface 34 is joined to end 12 by a frusto-conical surface 36 which makes an angle of about 45 degrees with the sleeve axis. The diameter of each surface 36 at end 12 is the same as that of surface 26.

Surface 29 also joins surface 25 and each lobe 28.

Each lobe 28 also has a section extending longitudinally from surface 29 toward end 12, and each such section is provided with an external thread segment 38. Thread segments 38 are of the same thread size as and are in phase with thread 24. The ends of thread segments 38 remote from surface 29 define a plane perpendicular to the sleeve axis.

Each lobe 28 further has a section extending longitudinally from the end of thread segment 38 thereof remote from surface 29 to surface 34 thereof and each such section is provided with a thread segment 40. Thread segments 40 are of the same minor and pitch diameters as, are of the same thread angle as and are in phase with thread 24 but the major diameter of thread segments 40 is defined by a frusto-conical surface which tapers from the major diameter of thread segments 38 at the juncture of thread segments 38 and 40 to the diameter of surfaces 34 at the juncture of thread segments 40 and surface 34. In the illustrated example, the frusto-conical surface referred to in this paragraph makes an angle of about 8 degrees with the sleeve axis.

Associated with each lobe 28 and interrupting leading edge 30 thereof is a cylindrical hole 42 extending completely through the wall of sleeve 8. Holes 42 are identical with each other and are evenly spaced circumferentially of sleeve 8. The axes of holes 42 are perpendicular to the sleeve axis and are in the plane defined by the ends of thread segments 38 remote from surface 29. The axis of each hole 42 passes through surface 26 between leading edge 30 of that lobe 28 with which hole 42 under consideration is associated and that trailing edge 32 which that leading edge 30 confronts as aforesaid.

End 10 of sleeve 8 has a plurality of identical recesses 44 which are evenly spaced circumferentially. As shown in FIG. 6 there are six recesses 44.

The illustrated blind bolt also includes a screw 46 (FIGS. 2 and 6) having at one end a flush head 48 which as shown is provided with a cruciform type driving slot 50. Head 48 has a frusto-conical surface 52 adapted to engage surface 17 of sleeve 8. Screw 46 also has a cylindrical shank portion 54 axially adjacent head 48 adapted to fill surface 22 of sleeve 8 for a portion of the length of surface 22 commencing at the end thereof remote from end 12 of sleeve 8.

Additionally screw 46 has at the end thereof remote from head 48 a threaded portion provided with an external thread 56 adapted for screw threaded engagement with thread 20. The diameter of shank portion 54 is greater than the major diameter of thread 56.

Between shank portion 54 and the threaded portion of screw 46 screw 46 has a frusto-conical shank portion 58 joining portion 54 and tapering from the diameter thereof to about the minor diameter of thread 56. Between and joining shank portion 58 and the threaded portion of screw 46, screw 46 has a cylindrical shank portion 60 the diameter of which is about the minor diameter of thread 56.

The manner of installing the illustrated blind bolt will now be set forth, but first let it be stated that sleeve 8 can be installed directly in holes in plates, which holes are drilled to a normal commercial tolerance between a minimum diameter equal to the diameter of surfaces 34 and a maximum diameter equal to about the pitch diameter of thread 24. As an example, if the thread angle of thread 24 is 60 degrees and there are 72 turns per inch and the major, minor and pitch diameters are 0.250 inch, 0.240 inch and 0.245 inch, the diameter of surfaces 34 will be 0.240 inch and sleeve 8 will be installable in drilled holes which are between 0.240 and 0.245 inch in diameter.

FIG. 1 shows outer and inner plates 62 and 64, respectively. Plate 62 has an exposed face 66 and a second face 68 and plate 64 has a face 70 confronting face 68 and a blind face 72.

Plates 62 and 64 have aligned holes of the same nominal size therethrough which are drilled to normal commercial tolerances and the end of the hole through plate 62 at face 66 is countersunk to a depth equal to the axial length of sleeve head 14 and adapted to receive head 14. The diameter of the holes through plates 62 and 64 is related dimensionally to sleeve 8 as set forth above.

FIG. 1 also shows operative portions of a tool for installing sleeve 8 in plates 62 and 64, namely, a mandrel 74 having an external thread 76 adapted for threaded engagement with sleeve thread 20 and an annular portion 80 surrounding mandrel 74 and having projections 82 adapted to engage sleeve recesses 44.

Mandrel 74 is axially movable with respect to annular portion 80 but is not rotatable with respect thereto.

To install sleeve 8 in plates 62 and 64, mandrel 74 is inserted into sleeve 8 from end 10 thereof and sleeve 8 is rotated so that threads 20 and 76 screw threadedly engage each other, until, as shown in FIG. 1 the end of mandrel 74 coincides approximately with the plane defined by the axes of holes 42. Mandrel 74 is then moved axially with respect to annular portion 80 until projections 82 engage recesses 44.

With sleeve 8 thus positioned on the installation tool sleeve end 12 is inserted into the holes through plates 62 and 64. During this insertion the tool and sleeve 8 are rotated and the portions of lobes 28 having surfaces 34 assure the coincidence of the sleeve axis and the axes of the holes through plates 62 and 64. Leading edges 30 of the portions of lobes 28 having surfaces 34 also clean out the plate holes and, if the holes are of minimum diameter within the tolerance therefor will perform a reaming action.

Thus those parts of lobes 28 having surfaces 34 provide sleeve 8 with a combined pilot and reaming portion.

Continued turning of the tool and sleeve 8 causes thread segments 40 to engage the walls of the holes through plates 62 and 64 and to perform a finish ream of these holes and the start of a tapping operation. Segments 40 are followed through the holes by segments 38 which complete the tapping operation. By the time segments 38 have traversed the holes the walls thereof are provided with a thread adapted for screw threaded engagement with thread 24, and the minor diameter of the tapped holes will vary slightly, depending on the initial hole diameters.

Thus sleeve 8 also has a self-tapping portion.

During the tapping chips are produced and these find escape through holes 42.

After the tapping is completed the rotation of the tool and sleeve 8 is continued until sleeve head surface 16 engages the countersunk portion of the hole through plate 62. At this point the relevant parts are as shown in FIG. 1. During this continued rotation unthreaded cylindrical surface 23 is drawn into the plate holes and as this happens the finely-tapped plate threads are wiped or bent toward blind face 72, resulting in a "line-to-line" or tight fit of surface 23 in the plate holes.

Plates 62 and 64 may be initially separated as shown in FIG. 1, and it is advantageous for them to be drawn tightly together. Sleeve 8 does this. Further rotation of the tool and sleeve 8 after the parts are as shown in FIG. 1 will cause plate 64 to function much as a nonrotatable nut through which thread 24 will advance, thus to draw up plate 64 against plate 62.

When this condition is reached rotation is stopped and mandrel 74 is pulled axially in the direction indicated by the arrow to the left of FIG. 1. This pulling causes the thin portion of the wall of sleeve 8 axially between blind face 72 and thread 20 to deform outwardly away from the sleeve axis in a buckling action as shown at 83 in FIG. 2, until sleeve 8 and plates 62 and 64 are as shown in FIG. 2.

Annular portion 80 of the tool is then retracted from engagement with sleeve 8 and the tool is rotated to withdraw mandrel 74 from sleeve 8.

The outward buckling results in a tight engagement of sleeve 8 against blind face 72 of plate 64.

If surface 22 has a tapered portion as aforesaid it will be assured that the deformation will start immediately adjacent face 72 since the wall of sleeve 8 will be thinnest at that location.

After the tool has been removed as aforesaid, screw 46 is inserted into sleeve 8 from end 10 thereof and rotated until thread 56 is in screw threaded engagement with thread 20 and screw head surface 52 engages sleeve head surface 17, as shown in FIG. 2. This completes the installation of the blind bolt.

Screw 46 is dimensioned completely to fill sleeve 8.

If desired, it is possible to install the blind bolt without the use of mandrel 74. In this case screw 46 is pre-installed in sleeve 8 and bulging of sleeve 8 is accomplished by holding sleeve 8 against rotation while rotating screw 46. This method of installation eliminates the axial pulling of a mandrel to cause the bulge and also the steps of removing the mandrel and replacing same with screw 46.

It may be desirable for thread 20 to be provided with a self-locking feature. This can be accomplished for example as shown in FIG. 7, illustrating a modified form of sleeve 84 which may be identical to sleeve 8 but for the fact that the wall of sleeve 84 at the end thereof remote from its head is offset toward the sleeve axis at three circumferentially spaced locations as indicated at 86, thus to deform the internal thread of sleeve 84 to provide a resilient frictional self-locking grip on thread 56 of screw 46.

It also may be desirable that sleeves 8 and 84 be harder at the reaming and tapping sections than at the deformable part. This can be accomplished by zone hardening.

It is a feature of the invention that the total thickness of the work to be fastened can vary within wide limits. The total thickness of plates 62 and 64 is the minimum which can be accommodated. The dotted line A in FIGS. 1 and 2 indicates the maximum thickness. Of course the greater the thickness the less will be the bearing area of the sleeve against the blind face of the plates. One example of the invention can be used effectively where the total plate thickness is between 0.375 and 0.438 inch.

If it becomes desirable to remove the blind bolt it is merely necessary to back screw 46 out and drill out the sleeve with a drill of suitable size. No damage to the plates will result.

The blind bolt can be retightened at any time, thus simulating the usual bolt and nut combination.

Some angularity of faces 66 and 72 can be tolerated without substantial loss in performance.

A blind bolt in accordance with the invention is well adapted to the attainment of the stated objects and advantages and others.

The disclosed details are not to be taken as limitations on the invention except as they may be included in the appended claims since many changes which will occur to those skilled in the art can be made without departing from the invention.

What is claimed is:

1. A blind fastener comprising a tubular sleeve defining an axis and having first and second ends, a head at said first end, a first annular portion having a predetermined wall thickness axially spaced from said head and having an internal screw thread, a second annular portion having a wall thickness substantially less than said predetermined wall thickness axially between said head and said first annular portion and outwardly deformable by force tending to shorten said sleeve, and an external screw thread axially between said head and said second end and having at the axial end thereof remote from said second end a circumferentially continuous portion partly on each said annular portion and having predetermined major, minor and pitch diameters and at the axial end thereof remote from said head a circumferentially discontinuous self-tapping portion in phase with said continuous portion and having at the axial end thereof adjacent said circumferentially continuous portion said major, minor and pitch diameters, for tapping aligned cylindrical holes of predetermined diameter less than said major diameter through inner and outer plates to be clamped together by said sleeve, and said sleeve further having an unthreaded cylindrical external surface axially between said head and said continuous thread portion and joining the latter and having a diameter substantially equal to said pitch diameter, said unthreaded cylindrical external surface extending axially from said head a distance which is greater than the axial length of said cylindrical hole of said outer plate and less than the sum of said length and the axial length of said cylindrical hole of said inner plate, whereby said sleeve can be rotated into said plates, with said second end of said sleeve entering said outer plate, to cause said self-tapping portion to tap said cylindrical holes as aforesaid, after which said unthreaded external cylindrical surface will bend over the threads so tapped except for part of the threads so tapped in said inner plate, thus to create a tight fit between said unthreaded external cylindrical surface and said plates and assuring that said plates will be tightly drawn together prior to outward deformation of said second annular portion of said sleeve to form a bulge against said inner plate.

2. The invention set forth in claim 1 wherein said internal thread is self-locking.

3. The invention set forth in claim 1 wherein said self-tapping portion is provided by a plurality of lobes each having a leading cutting edge.

4. The invention set forth in claim 3 wherein said sleeve has a chip receiving recess in communication with each said leading edge.

References Cited in the file of this patent

UNITED STATES PATENTS

| | | |
|---|---|---|
| 1,394,608 | Davern | Oct. 25, 1921 |
| 2,188,422 | Waner | Jan. 30, 1940 |
| 2,407,741 | Goodby | Sept. 17, 1946 |
| 2,408,559 | Keating | Oct. 1, 1946 |
| 2,479,730 | Dewar | Aug. 23, 1949 |
| 2,795,221 | Braendel | June 11, 1957 |
| 2,914,106 | Boyd | Nov. 24, 1959 |